(12) United States Patent
Matsugu et al.

(10) Patent No.: US 6,907,140 B2
(45) Date of Patent: Jun. 14, 2005

(54) IMAGE RECOGNITION/REPRODUCTION METHOD AND APPARATUS

(75) Inventors: Masakazu Matsugu, Ohamishirasato-machi (JP); Katsumi Iijima, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/265,923

(22) Filed: Oct. 7, 2002

(65) Prior Publication Data

US 2003/0044073 A1 Mar. 6, 2003

Related U.S. Application Data

(63) Continuation of application No. 08/893,929, filed on Jul. 15, 1997, now Pat. No. 6,463,176, which is a continuation of application No. 08/383,017, filed on Feb. 2, 1995, now abandoned.

(30) Foreign Application Priority Data

Feb. 2, 1994  (JP) .............................................. 6-010806
May 23, 1994 (JP) .............................................. 6-108139

(51) Int. Cl.[7] .............................................. G06K 9/46
(52) U.S. Cl. ..................... 382/195; 382/217; 382/243
(58) Field of Search ............................... 382/118, 195, 382/217–218, 243, 199, 165

(56) References Cited

U.S. PATENT DOCUMENTS

| | | | |
|---|---|---|---|
| 4,115,761 A | 9/1978 | Ueda et al. | 340/146.3 |
| 4,281,312 A | 7/1981 | Knudson | 382/253 |
| 4,388,610 A | 6/1983 | Tsunekawa | 382/113 |
| 4,630,307 A | 12/1986 | Cok | 382/203 |
| 4,686,636 A | 8/1987 | Schrieber | 345/442 |
| 4,712,248 A | 12/1987 | Hongo | 382/199 |
| 4,910,608 A | 3/1990 | Whiteman et al. | 382/253 |
| 5,016,173 A | 5/1991 | Kenet et al. | 364/413.13 |
| 5,022,091 A | 6/1991 | Carlson | 382/240 |
| 5,060,280 A | 10/1991 | Mita et al. | 382/217 |
| 5,280,530 A | 1/1994 | Trew et al. | 382/103 |
| 5,325,444 A | 6/1994 | Cass et al. | 382/177 |
| 5,416,899 A | 5/1995 | Poggio et al. | 395/152 |
| 5,457,754 A | 10/1995 | Han et al. | 382/128 |
| 5,459,636 A | 10/1995 | Gee et al. | 364/516 |
| 5,479,529 A | 12/1995 | Nakagawa et al. | 382/118 |
| 5,537,662 A | 7/1996 | Sato et al. | 395/135 |
| 5,568,384 A | 10/1996 | Robb et al. | 364/419.13 |
| 5,995,639 A | 11/1999 | Kado et al. | 382/118 |
| 6,463,176 B1 * | 10/2002 | Matsugu et al. | 382/195 |

FOREIGN PATENT DOCUMENTS

| | | |
|---|---|---|
| JP | 5 9106071 | 6/1984 |
| JP | 613287 | 1/1986 |
| JP | 6 2226389 | 10/1987 |
| JP | 512413 | 1/1993 |

OTHER PUBLICATIONS

Shackleton et al. "Classification of Facial Features for Recognition." Proc. of CVPR '91, IEEE Computer Society Conf. on Computer vision and Pattern Recognition, Jun. 3, 1991, pp. 573–579.*

(Continued)

*Primary Examiner*—Jon Chang
(74) *Attorney, Agent, or Firm*—Morgan & Finnegan, LLP

(57) ABSTRACT

An image recognition/reproduction method includes an extraction step of extracting local feature elements of an image, and a selection step of selecting a pair composed of a prescribed local feature element and position information indicative thereof, this pair being such that the distance between a pair composed of a prescribed local feature element and position information indicative thereof and a pair composed of a local feature element extracted at the extraction step and position information indicative thereof is less than a prescribed distance.

10 Claims, 14 Drawing Sheets

OTHER PUBLICATIONS

Sutherland et al. "A Novel Automatic Face Recognition Algorithm Employing Vector Quantization." IEE Conference on Machine Storage and Recognition of Faces, Jan. 24, 1992, pp. 4/1–4/4.*

Brunelli et al. "Face Recognition: Features versus Templates." IEEE Trans. on Pattern Analysis and Machine Intelligence, vol. 15, No. 10, Oct. 1993, pp. 1042–1052.*

Shackleton. "Learned Deformable Templates for Object Recognition." Colloquium on Genetic Algorithms in Image Processing and Vision, Oct. 20, 1994, pp. 7/1–7/6.*

Rabbani et al., "Digital Image Copression Techniques", SPIE Optical Engineering Press, vol. TT7, pp. 144–169, 1991.

Sutherland et al., "Automatic Face Recognition", 1st Int. Conf. in Intelligent Systems Engineering, pp. 29–34, 1992.

Yau et al., "A Feature Tracking Method for Motion Parameter Estimation in a Model–Based Coding Application" 3rd Int. Conf. on Image Processing and its Applications, pp. 531–535, 1989.

Webster's Ninth New Collegiate Dictionary, p. 632 Jan. 1991.

* cited by examiner

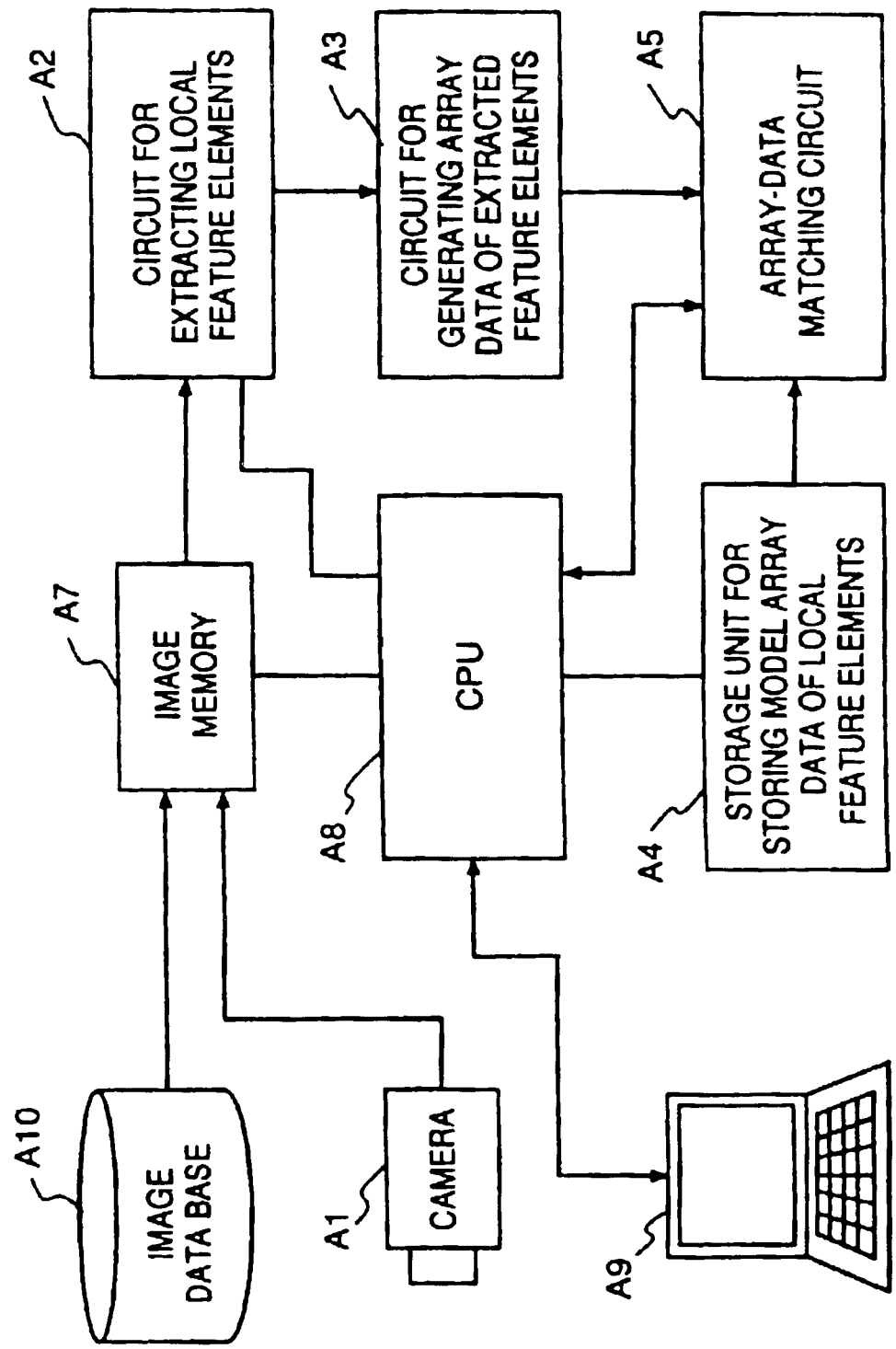

FIG. 2

| | | |
|---|---|---|
| L-TYPE INTERSECTION | $<$ $\angle$ $\vee$ $\lrcorner$ $>$ $\urcorner$ $\wedge$ $\sqcap$ | |
| | $L_1$ $L_2$ $L_3$ $L_4$ $\overline{L}_1$ $\overline{L}_2$ $\overline{L}_3$ $\overline{L}_4$ | |
| CURVES (CURVATURES) | $\smile$ $\frown$ $($ $)$ ------ | |
| | $C_{v1}$ $\overline{C}_{v1}$ $C_{v2}$ $\overline{C}_{v2}$ | |
| ARROW-TYPE INTERSECTIONS | $\lessdot$ $\gtrdot$ $\wedge$ $\vee$ ------ | |
| | $A_{r1}$ $\overline{A}_{r1}$ $A_{r2}$ $\overline{A}_{r2}$ | |
| CIRCLE | $\bigcirc$ | |
| | $C_r$ | |
| T-TYPE INTERSECTIONS | $\top$ $\bot$ $\vdash$ $\dashv$ ------ | |
| | $T_1$ $\overline{T}_1$ $T_2$ $\overline{T}_2$ | |

9 : EYES
5 : NOSE
1 : MOUTH

ORIGINAL STRUCTURAL INFORMATION

INITIAL CONTOUR

INITIAL CONTOUR

AFTER CONVERGENCE OF ACTIVE CONTOUR

FIG. 14

| j | N | f | $\vec{r}$ | | | | | | | |
|---|---|---|---|---|---|---|---|---|---|---|
| 1, | n₁, | $f_1^1$, | $x_1^1$, | $y_1^1$, | $f_2^1$, | $x_2^1$, | $y_2^1$, | ------, | $f_{n1}^1$, | $x_{n1}^1$, $y_{n1}^1$ |
| 2, | n₂, | $f_1^2$, | $x_1^2$, | $y_1^2$, | $f_2^2$, | $x_2^2$, | $y_2^2$, | ------, | $f_{n2}^2$, | $x_{n2}^2$, $y_{n2}^2$ |
| ⋮ | | | | | | | | | | |
| m, | n_m, | $f_1^m$, | $x_1^m$, | $y_1^m$, | $f_2^m$, | $x_2^m$, | $y_2^m$, | ------, | $f_{nm}^m$, | $x_{nm}^m$, $y_{nm}^m$ |

IMAGE RECOGNITION/REPRODUCTION METHOD AND APPARATUS

This is a continuation of application Ser. No. 08/893,929, filed Jul. 15, 1997, now U.S. Pat. No. 6,463,176, which is a continuation of application Ser. No. 08/383,017, filed Feb. 2, 1995, now abandoned.

BACKGROUND OF THE INVENTION

This invention relates to a method and apparatus for recognizing objects and for reproducing the images of objects.

Description of the Related Art

One known example of a conventional method of displaying figure patterns or the like is a technique used in inputting figures as disclosed in the specification of Japanese Patent Publication (KOKOKU) No. 5-36830. The technique includes expressing the bent portion of the stroke of a geometrical figure symbol by one of various bend patterns (shape primitives) prepared in advance and approximating curves by circular arcs. The technique is applicable to recognition of geometrically simple figures.

Further, an example of a method of recognizing objects is employed in an object recognition apparatus disclosed in the specification of Japanese Patent Publication (KOKOKU) No. 5-23463. This method involves tracing the contour of a recognized object, dividing up the contour into shape primitives such as straight lines or circular arcs, registering the attribute of each shape primitive and the attribute of each vertex in memory in the form of a dictionary, searching the dictionary in the memory and subjecting an unknown object to recognition by matching the shape primitives thereof with those of the recognized object.

In the example of the prior art described above, the relationship among the shape primitives arranged in space is not extracted for the purpose of recognition. Therefore, in a case where image patterns differ depending upon the point of view, even though the objects are identical, or in a case where a change in shape or size is produced for some reason, it is required that an enormous amount of two-dimensional pattern information be stored with regard to the identical subjects and that matching be carried out relative to this voluminous pattern information at the time of pattern recognition. A problem that arises is an increase in cost of computations.

Further, in a case where a plurality of objects exist in an image, it is required that the image be partitioned beforehand into appropriate areas. After area partitioning is performed in such a manner that one object will exist in one area, recognition processing is applied.

Such area partitioning and recognition of object patterns are two sides of the same thing and it is very difficult to execute them perfectly in automatic fashion.

Further, there are prior-art examples of techniques for reconstructing an object that has been recognized. For example, the specification of Japanese Patent Application Laid-Open (KOKAI) No. 5-12413 discloses an image generating apparatus in which the three-dimensional shapes and distances of objects in an image are taken into account and images corresponding to points of view are generated by just a few items of data. This method involves using a three-dimensional measuring device to previously measure points on a surface on which an object of interest can be reproduced and storing the three-dimensional coordinates in memory. When a reproduced image is generated, positions on a screen for a reproduced image are obtained from the positional relationship between the point of view and the object of interest, and a display is presented in accordance with luminance level or RGB values from the relationship among corresponding points relative to an image obtained previously at a different point of view.

Further, in a synthesized-image generating apparatus disclosed in the specification of Japanese Patent Publication No. 5-60148, a reference image and a three-dimensional model of an object of interest are stored in a prescribed memory in advance. At playback, the zoom rate of the image of interest, distance of movement on a screen and angle of rotation are computed from disparities with respect to distance and azimuth as seen from a point of view different from that at the time the reference image and three-dimensional model were stored, and a geometrical transformation based upon these computed values is applied to generate an image of interest as observed from the different point of view.

With this example of the prior art, a more detailed three-dimensional model relating to the object of interest is required in order to process the image of a specific target in the image of an actual photograph and combine the image with that of a different scene, or to move and transform the specific target while taking masked portions into account.

Further, in order to obtain a more detailed three-dimensional shape model relating to the object of interest, there is a need for detailed measurement as by a technique for obtaining the shape model from a parallax image acquired by shape measuring means or by binocular stereoscopic camera. As a result, computation costs are high and processing requires an extended period of time.

SUMMARY OF THE INVENTION

Accordingly, an object of the present invention is to provide a pattern recognition method and apparatus in which recognition is performed based upon a limited number of feature elements and information relating to the relative disposition of the feature elements in space.

Another object of the present invention is to provide an image generating method and apparatus in which images are generated at low computation cost and in a short processing time without use of a detailed three-dimensional shape model.

According to the present invention, the foregoing objects are attained by the apparatus or methods described below.

Specifically, the present invention provides an image recognition method comprising an extraction step of extracting local feature elements of an image, and a selection step of selecting a pair composed of a prescribed local feature element and position information indicative thereof, this pair being such that the distance between a pair composed of a prescribed local feature element and position information indicative thereof and a pair composed of a local feature element extracted at the extraction step and position information indicative thereof is less than a prescribed distance.

Further, the invention provides an image reproduction method comprising an extraction step of extracting a feature element immediately prior to occurrence of an occlusion in which at least part of a feature element of an object is hidden behind another feature element, a second feature-element generation step of generating a second feature element on the basis of a plurality of feature elements immediately prior to occurrence of the occlusion extracted at the extraction step,; and a step of reproducing an image on the basis of the second feature element generated by the second feature-element generation step.

Further, the present invention provides an image recognition apparatus comprising extracting means for extracting local feature elements of an image, and selecting means for selecting a pair composed of a prescribed local feature element and position information indicative thereof, this pair being such that the distance between a pair composed of a prescribed local feature element and position information indicative thereof and a pair composed of a local feature element extracted by the extracting means and position information indicative thereof is less than a prescribed distance.

Further, the invention provides an image reproduction apparatus comprising reproducing means for reproducing an image on the basis of interpolation between the pair composed of the prescribed local feature element and position information indicative thereof selected by the selecting means and a pair in the vicinity thereof.

Further, the invention provides an image reproduction apparatus comprising extracting means for extracting a feature element immediately prior to occurrence of an occlusion in which at least part of a feature element of an object is hidden behind another feature element, second feature-element generating means for generating a second feature element on the basis of a plurality of feature elements immediately prior to occurrence of the occlusion extracted by the extracting means, and means for reproducing an image on the basis of the second feature element generated by the second feature-element generating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a diagram illustrating the construction of an image recognition apparatus in a first embodiment of the present invention;

FIG. 2 is a diagram illustrating local feature element patterns that have been extracted;

FIG. 14 is a diagram illustrating an example of the storage format of time-series data of the shapes and disposition of local feature elements.

DESCRIPTION OF THE PREFERRED EMBODIMENTS

Preferred embodiments of the present invention will now be described in detail with reference to the accompanying drawings.

First through fourth embodiments set forth below illustrate a method of recognition processing. In fifth and sixth embodiments, the invention is described with regard to processing for reproducing an image on the basis of the results of recognition.

FIG. 1A is a diagram showing the configuration of an image recognition system, in which the arrows indicate the flow of principal data. The system includes a camera (video input unit) A1, a disk A10 on which an image data base has been constructed, an image memory A7 for temporarily holding an image from the camera A1 or image data base A10, a circuit A2 for processing the image from the camera A1 and extracting local feature elements, a circuit A3 which, on the basis of the extracted feature elements, generates element array data as structural information indicative of an image, a storage unit A4 for recognition model data relating to a plurality of objects, the storage unit holding structural information similar to that of the data generated by the circuit A3, a matching processing circuit A5 for performing matching between the recognition model data and the extracted structural information, a CPU A8 and a terminal A9. On the basis of the name or shape concept of an object entered at the terminal A9, and using the CPU A8, the matching processing unit A5 extracts model data of a specific category from the storage unit A4 and executes comparison processing. The CPU A8 executes the overall processing flow and controls the operation of each of the processing modules (A2, A4, A5, etc.). It should be noted that the circuit arrangement is not limited to that shown in FIG. 1A; it will suffice if the circuit arrangement adopted has the processing functions described above.

The result of matching processing by the matching processing circuit A5 is read in by the CPU A8 and compared with a prescribed recognition threshold value. A recognition candidate having a value larger than the threshold value is selected. The coordinates of a position contained in the image of the selected recognition candidate, a marker indicating this position or a recognized target is cut from the image, a conversion is made to structural information, described later, and the structural information is displayed on the image-display input unit A9.

Further, in the matching processing circuit A5, the category of a recognition target or shape concept data is entered from the image-display input unit A9 so that matching processing can be carried out.

Furthermore, the CPU A8 has an internal ROM (not shown) storing the program that describes the overall recognition processing of this embodiment, and an internal RAM (not shown) serving as a work area for processing of the program. The CPU A8 reads the program out of the ROM, interprets the program and executes it.

Figure 1B:
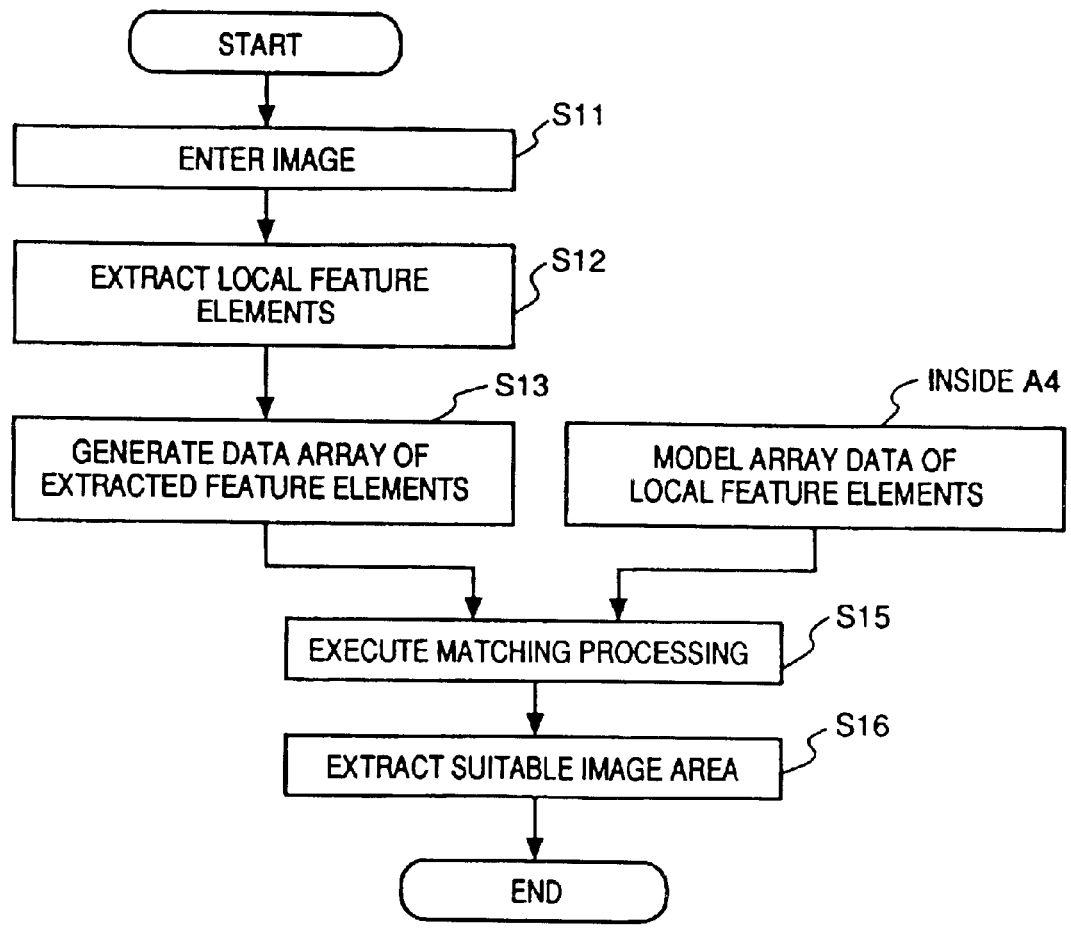
FIG. 1B is a flowchart of image recognition processing according to the first embodiment of the invention.

FIG. 1B is a flowchart of recognition processing in a first embodiment of the present invention. At step S11, image data obtained from the camera A1 is recorded in the image memory A7. Next, at step S12, the circuit A2 for extracting local feature elements is used to extract, in each area of the image, a limited number of local feature elements, of a plurality of scales (sizes), set in advance by a scaling parameter σ. In this case, data other than that representing the extracted local feature elements is not held. Examples of the local feature elements are those constituted by intersection patterns (L-, T-, X- and Y-type intersections, etc.) of various edge segments and line segments (curves) such as curve segments having various curvatures (assumed to be fixed) and orientations. The scaling parameter σ indicates a scaling ratio with respect to a basic unit "1", which serves as the basic unit of the resolution of the original image that has entered from the camera A1. At step S13, each local feature element is converted by a prescribed data format to generate array data, from the data representing the extracted local feature elements, on a two-dimensional array structure (cell array) established in advance. The array data possesses a rough placement relationship. At step 15, matching is performed between local feature-element patterns (model array data) serving as a template stored beforehand in the storage unit A4 and the feature-element patterns that have been extracted at step S13. The matching method involves computing the sum of the squares of the differences between the elements of the matching patterns (this shall be referred to as an "error quantity") and selecting model array data for which the error quantity is less than a predetermined threshold value. This processing is executed by the array-data matching circuit. Finally, at step S16, an array present in the original image corresponding to the selected model array data is extracted.

It should be noted that the sum of the squares of the differences mentioned above may be the sum of the absolute values of differences.

The details of the processing of the steps from step S12 onward will now be described.

FIG. 2 is a diagram illustrating one example of extracted local feature elements. Examples of methods of extracting intersection patterns of edge segments, which are the local feature elements to be extracted at step S12, are described by Deriche, R. and Giraudon, G. (1993) (*International Journal of Computer Vision*, Vol. 10, 101~124); Rohr, K. and Schnoerr, C. (1993) (*Image and Vision Computing*, Vol. 11, 273~277); and Iso, Shizawa (1993) (*Shingaku Giho*, Vol. 1E92-125, pp. 33~40). The method is not particularly limited to those mentioned here. In FIG. 2, a limited number of elements ($L_1, L_2, \ldots,$
$\overline{L}_1, \ldots, \overline{L}_4$)
(eight in the illustrated example) having different orientations are shown as L-type intersections. The angle β of intersection satisfies the inequality 0°<β<180°. The categories of L-type intersections are not decided by angle of intersection. Rather, the intersections are classified into eight types depending upon orientation (the direction of the bisector of the intersection). T-, X-, Y- and arrow-type intersections obtained by combinations of L-type intersections also can be extracted by a method as described by Rohr, K and Schnoerr, C (1993), mentioned above.

Examples of methods of extracting curve elements having a fixed curvature, which are the other local feature elements, are described in Koenderink, J. and Richards, W. (1988) (*J. Opt. Soc. Am. A*, Vol. 5, pp. 1136~1141) and Li, S. Z. (1990) (*International Journal of Computer Vision*, Vol. 5, pp. 161~194). In FIG. 2, curve elements having a fixed curvature, namely the directions of circular arcs, are classified into a limited number of elements ($C_{V1}, C_{V2}, \ldots,$
$\overline{C}_{v1}, \ldots, \overline{C}_{v4}$)
(eight in the illustrated example) depending upon the directions of inward normals at the midpoints of the circular arcs.

Furthermore, the scaling parameter σ in the extraction of the above-mentioned intersection patterns or curvature elements is set discretely to a limited number of values (e.g., five values of σ=2, 4, 8, 16, 32 pixels) and extraction of local feature elements is performed for each scaling parameter value. Further, the parameter σ represents the degree of smoothing performed when intersection patterns or curvature elements are extracted. (For example, smoothing is performed based upon a convolution with the Gaussian function below.)

$$G(x, y) = \frac{1}{\sqrt{2\pi}} \exp\left(-\frac{x^2 + y^2}{2\sigma^2}\right)$$

At step S12, processing is performed up to processing for extracting and encoding the closest of the prescribed local feature elements (e.g., the feature elements shown in FIG. 2). An example of a method of extracting the closest element is to extract the closest distance among the distances between several feature quantities representing the feature elements shown in FIG. 2. The extracted feature elements are then encoded.

Figure 3:
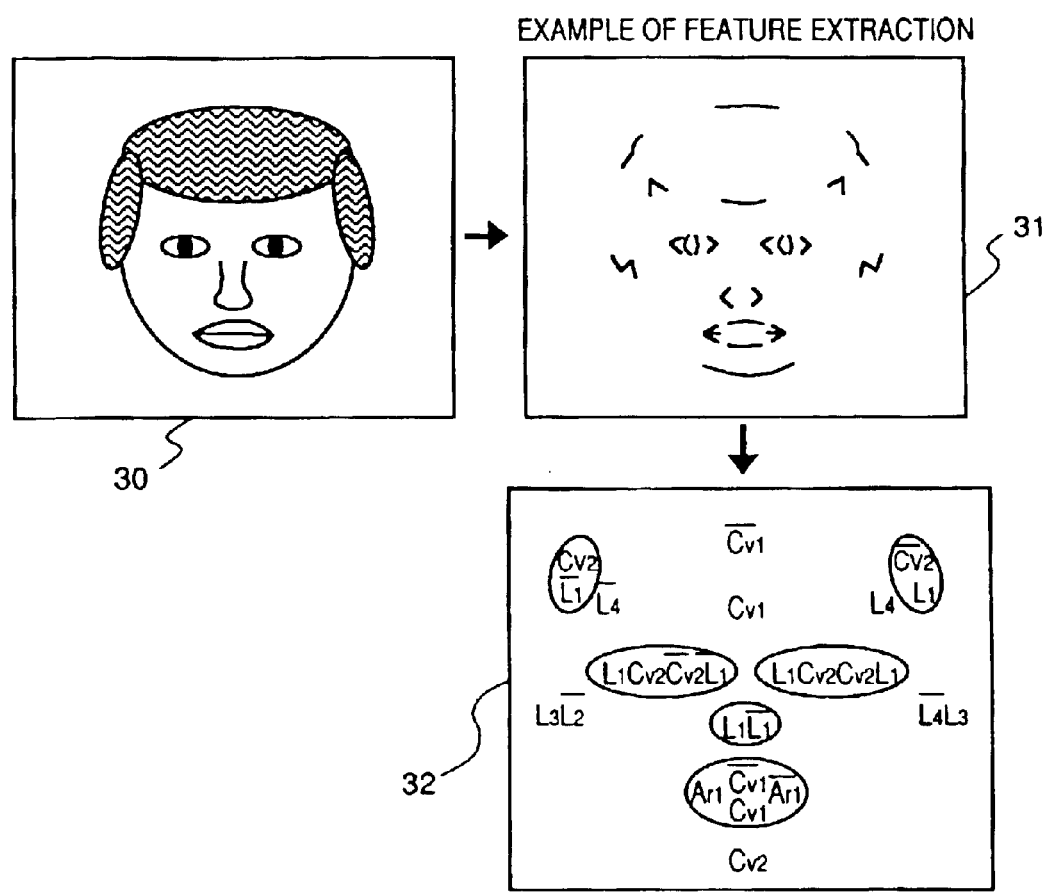
FIG. 3 is a diagram illustrating an example of the encoding of a facial image using the local feature elements of FIG. 2.

FIG. 3 is a diagram showing an example of encoding of a facial image using the local feature elements of FIG. 2. Here the facial image is encoded based upon a certain scaling parameter σ.

In FIG. 3, numeral 30 denotes an image of an original that has been entered from the camera A1, and 31 an image obtained by feature extraction at step S12 and substitution by the feature template elements illustrated in FIG. 2. Numeral 32 denotes symbols corresponding to the various features in image 31. These symbols (which are written directly below the feature elements in FIG. 2) are arranged at the corresponding positions. (This processing shall be referred to as "encoding".)

It should be noted that the positions at which the symbols are placed are arranged relative to one another in a space the size of which corresponds to each scaling parameter σ.

The processing of step S13 will now be described in further detail.

Figure 4:
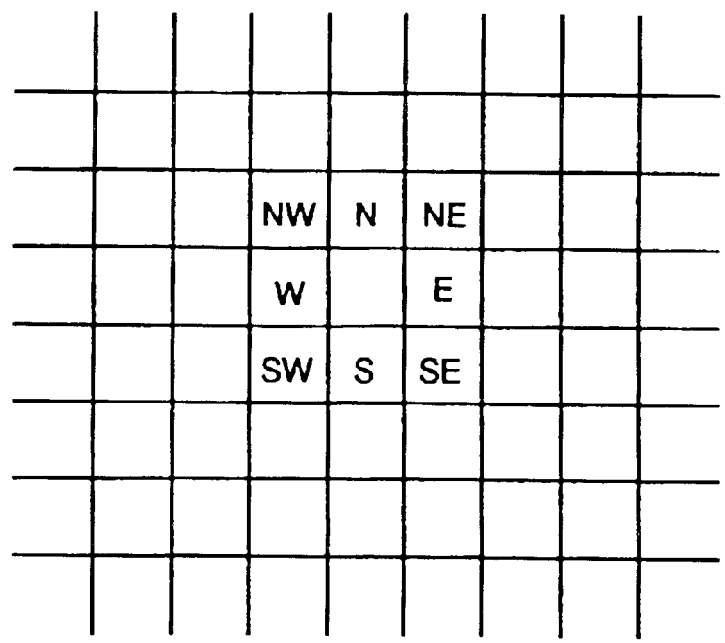
FIG. 4 is a diagram illustrating an example of a lattice space for displaying an array of local feature elements that have been encoded.

The relationship of the spatial disposition of the encoded local feature elements is expressed by mapping them in a lattice space (which corresponds to each scaling parameter σ) comprising cells of a prescribed size and shape. FIG. 4 is a diagram illustrating an example of a lattice space for the purpose of displaying the array of encoded local feature elements. In FIG. 4, the lattice space is partitioned into the eight directions N, E, W, S, NE, NW, SW, SE, and the square lattice size is set to correspond to the scaling parameter σ. The symbols corresponding to the extracted features are assigned to the lattice space. Thus resulting in a reconstruction to a rough disposition relationship among the local feature elements, an invariant image representation is obtained with respect to a transformation of the original image. Furthermore, by extracting this invariant representation format for each scaling parameter σ, an image to be recognized can be stored as common local feature element patterns that do not rely upon the size of the space of the relative disposition relationship among the encoded local feature elements.

Thus, in the first embodiment, an image is expressed by a combination of a smaller number of local feature elements and position information with respect to each point in the lattice space. As a result, it is possible to improve the efficiency of the object recognition process (i.e., to lower the computation cost) and enable object recognition that is not readily susceptible to a change in the size of an object in an image or to deformation of the object.

Next, the encoding of the array data necessary in order to recognize an array of local feature elements mapped in lattice space will be described in greater detail.

In the first embodiment, recognition is executed at step S15 by matching the model array data and the data representing the array of extracted feature elements generated from an actual image. A specific processing method is as follows: First, letting M represent the total number of local feature elements, each local feature element is given a number of from 1 to M, by way of example. The numbering method need not be particularly limited but it is preferred that local feature elements (e.g., L-type intersections having different orientations) contained in the same category be numbered consecutively or assigned numbers whose values are close together. Further, the values of cells (arrays) in which local feature elements do not exist are 0 or use values other than those of the above-mentioned assigned numbers. An ordinary template matching technique may be used as processing for recognition after the encoding of the numerical values of the local feature elements. However, this technique differs from the conventional template based method in that the model array data does not rely upon the size of the image. More specifically, when the local feature elements are encoded from an image at the respective scaling parameters $\sigma_1, \sigma_2, \ldots, \sigma_n$ and matching with model array data is performed, reduction or enlargement is carried out in such a manner that the lattice size of the model array will coincide with the lattice size of the data extracted from the actual image. Accordingly, it is unnecessary to prepare, for each different lattice size, model array data of the local feature elements of an image to be recognized.

For example, in the case of recognition of a facial image, model mask data of unchangeable size is created in advance by local feature elements such as L-type intersections and curve elements with regard to portions such as the eyes and mouth that are necessary for recognition, and model array data (which is reduced or enlarged in dependence upon the scaling parameter σ at the time the local feature elements are extracted) of unchangeable size possessing the relative positional relationship among the eyes and mouth is stored as a mask pattern, each area of the image after extraction of the local feature elements is scanned, and then the degree of matching with the model array data is computed on the basis of, say, an evaluation function of the degree of matching, described below. That is, letting $$I_T^\sigma(i,j)$$

represent the value (which corresponds to a local feature element) of a cell at a position in lattice space (i,j) of model array data normalized by the scaling parameter σ, and letting $$I_D^\sigma(i,j)$$

represent the value of a cell of a target for recognition at a position in the lattice space (i,j) normalized by the scaling parameter σ, the computation process for recognition is defined as follows:

$$F(k,p) = \sum_{i,j \in J} |I_T^\sigma(i,j), I_D^\sigma(i+k, j+p)|$$

By finding a position (k,p) at which F(k,p) is minimum (or maximum) and less (or greater) than a predetermined threshold value, an output is obtained indicating at which position the target to be recognized is located in the original image. It is preferred that |x,y| be the absolute value of (x-y) or a non-negative value in an even function related to $(x-y)^{2n}$ (n=1, 2, . . . ). In this case, when |x,y| is less than the threshold value, it is recognized that y is x. Further, J indicates a range of array elements occupied by the recognition target in lattice space. This should be set in the manner (i=1, 2, . . . , q; j=1, 2, . . . , r) as a standard, where q, r represent the numbers of lattices in the row and column directions, respectively.

Further the function F(k,p) may be made of the following correlation function:

$$F(k,p) = \frac{\sum_{i,j \in J} I_M^\sigma(i,j), I_D^\sigma(i+k, j+p)}{\sqrt{\sum_{i,j \in J} \{I_M^\sigma(i,j)\}^2 \sum_{i,j \in J} \{I_D^\sigma(i+k, j+p)\}^2}}$$

In this case, (k,p), at which the correlation value F(k,p) is greater than the threshold value and maximum, is obtained while scanning the model array data $$I_T^\sigma(i,j)$$

of block size q×r in the extracted data $$I_D^\sigma(i+k,j+p)$$

acquired from the image. Furthermore, the processed results may be outputted to an image sensing system or an image editing system, the focus of which is a target to be recognized, so that a desired functional operation may be carried out.

Second Embodiment

Figure 5:
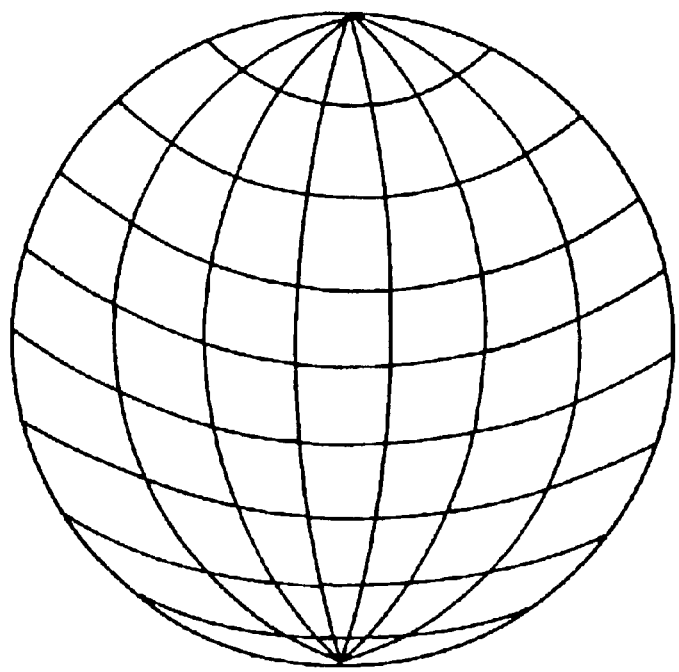
FIG. 5 is a structural diagram of three-dimensional lattice space in a second embodiment of the invention.

FIG. 5 is a structural view of three-dimensional lattice space in a second embodiment of the present invention. According to the second embodiment, a three-dimensional spatial relationship of the local feature elements described in the first embodiment is acquired and modeled. Techniques for three dimensional measurement that can be mentioned include a method of extracting corresponding points from an actual photographic image (e.g., a stereoscopic image obtained by photography using two cameras spaced by a prescribed distance from each other) by image processing, a method of measuring the phase of reflected light upon irradiation with a laser beam, and a method of projecting a structural pattern (a mesh pattern or the like) and measuring the degree of deformation thereof.

In FIG. 5, the cell shape of the lattice space is a shape obtained by dividing up a sphere equally in the directions of longitude and latitude. However, the cell shapes may be obtained by dividing up another solid (such as a circular cylinder) using another shape (such as a triangle). Thus, a three-dimensional lattice space can be applied to a case in which an image obtained by observing an object of interest from any point of view is subjected to recognition. More specifically, even for the same target, the image obtained by viewing the target from a certain point of view and the image obtained by viewing the target from a another point of view generally differ. On the basis of only one two-dimensional image, it is difficult to predict a change in an image pattern when the position of the point of view is changed. Further, recording images from all points of view and utilizing them in recognition is almost impossible because of the enormous amount of data involved. However, by mapping the three-dimensional spatial relationship of a limited number of local feature elements on representative points (points in lattice space) made three-dimensionally discrete, adopting the result as model data for mapping and measuring the degree of matching with an actual image in the same domain (lattice space), it is possible to greatly improve the efficiency of processing, and reduce the required memory capacity, necessary for image recognition of a solid from the position of any point of view.

In the second embodiment, matching processing similar to that of the first embodiment is executed while scanning an array of N×M blocks (N>n, M>m) from an actual image on the basis of model array data of an array of n×m blocks obtained by setting a numerical value (or symbol) specific to the local feature element in individual cells of an area (which corresponds to a range seen when an image to be recognized is viewed from a certain point of view) comprising a limited number of cells covering a sphere.

Third Embodiment

Figure 6:
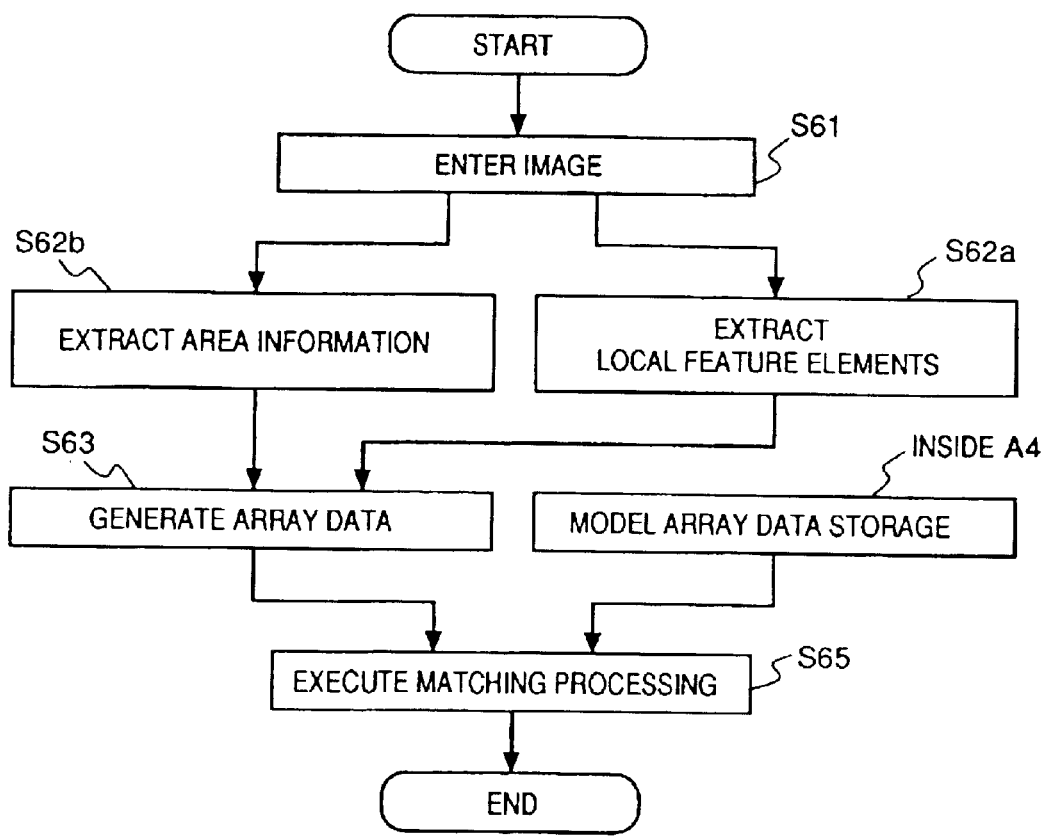
FIG. 6 is a flowchart of image recognition processing in a third embodiment of the invention.

FIG. 6 is a flowchart of recognition processing in a third embodiment of the present invention. Steps S61, S62a and S65 in FIG. 6 are similar to steps S11, S12 and S15, respectively, in FIG. 1. At step S62b, area information such as the representative color, average luminance and local spatial frequency of a neighboring area which includes local feature elements is acquired for each array block of a size conforming to the scaling parameter σ. The image entered at step S61 is subjected to the above-described processing at steps S62a, S62b. At step S63a, array data is generated from the above-mentioned local feature elements and area information acquired at steps S62a, 62b. It is assumed that model array data of extracted local feature elements and area information has been stored in the model array data storage unit A4 (FIG. 1) for each block of an image, which is to undergo recognition, partitioned beforehand by square blocks conforming to the scaling parameter σ.

A method of processing for two-dimensional image recognition in which the above-mentioned area information is color will now be described.

In order to express the representative color of each pixel (each pixel in lattice space) of each array block acquired, use is made of a color vector comprising the three primary colors R, G, B and defined below. The three representative color components $\overline{R}$, $\overline{G}$, $\overline{B}$ are as follows:

$$\overline{R}_{ij} = \frac{\sum_{\alpha\beta} I^R_{\alpha\beta}}{I}, \quad \overline{G}_{ij} = \frac{\sum_{\alpha\beta} I^G_{\alpha\beta}}{I}, \quad \overline{B}_{ij} = \frac{\sum_{\alpha\beta} I^B_{\alpha\beta}}{I}$$

$$I_{ij} = \sum_{\alpha\beta} (I^R_{\alpha\beta} + I^G_{\alpha\beta} + I^B_{\alpha\beta})$$

where α, β, ∈k [a pixel set inside the lattice space element i,j).

Here $I_{\alpha\beta}^R$ represents the output strength of the R pixel of the sensor at the pixel position (α, β) in the image, and $I_{\alpha\beta}^G$, $I_{\alpha\beta}^B$ are similarly defined. The symbol $$\sum_{\alpha,\beta}$$

indicates the summing of pixel values contained for each element [lattice space element (i,j)] of each array block. The sum is taken over all pixel positions (α, β) within the same block.

Thus, array data for recognition processing is generated at step S63 on the basis of local feature elements and area information such representative color acquired for each scaling parameter σ at steps S62a, S62b.

The model array data stored in the model array data storage unit A4 is each value of $I_{MF}^\sigma(i,j)$, which represents a local feature element, and $I_{MA}^\sigma(i,j)$, which is a representative color.

A first method of matching model array data and array data acquired from an image, namely a first method of recognition, may be one which includes first performing matching on the basis of the area information (color), then performing matching on the basis of local feature elements with regard to an area (block) in which rough analogous correspondence has been achieved based on color. A second method may be one which reverses the order of matching. In other words, this method includes extracting areas in which analogous correspondence has been achieved based upon local feature elements first, then narrowing down the analogous correspondence based upon color for each area. A third method may be one which includes finding such a position that the value of an overall evaluation function f $$f = f_F + \lambda f_A \quad (1)$$

obtained by adding an evaluation function $f_F$ of matching on the basis of local feature elements and an evaluation function $f_A$ of matching on the basis of area information (the latter being multiplied by an appropriate weighting λ) becomes less than a predetermined threshold value. In the first and second methods, "performing matching" means obtaining a (k,p) for which appropriate evaluation functions $$f_F(k, p) = \sum_{i,j \in J} |I_{MF}^\sigma(i, j), I_{DF}^\sigma(i+k, j+p)|$$

$$f_A(k, p) = \sum_{i,j \in J} |I_{MA}^\sigma(i, j), I_{DA}^\sigma(i+k, j+p)|$$

with regard to $I_{MF}^\sigma(i,j)$, $I_{MA}^\sigma(i,j)$ and the extracted data $I_{DF}^\sigma(i,j)$ $I_{DA}^\sigma(i,j)$ from an actual image have values less than a predetermined threshold value, as illustrated in the first embodiment. Furthermore, |x,y| is the function presented in the first embodiment.

Figure 7:
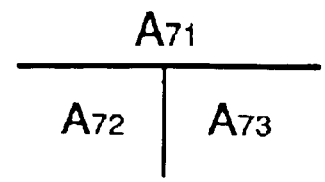
FIG. 7 is a diagram for describing three areas in a case where a T-type intersection is generated by masking.

By combining information representing local feature elements and area information, recognition can be performed without subdividing an area and including only one object in one area, even in a state in which parts of a plurality of objects overlap. FIG. 7 is a diagram for describing three areas in a case where a T-type intersection is produced by masking. In FIG. 7, when a T-type intersection is detected from an image at a size larger than that of other local feature elements and the attributes (color, for example) of three items of area information $A_{71}$, $A_{72}$, $A_{73}$ contiguous to the T-type intersection of this size such that $A_{72}$ and $A_{73}$ are approximately equal but much different from $A_{71}$, there is a possibility that this is equivalent to a situation in which the objects corresponding to $A_{72}$ and $A_{73}$ are partially masked or covered by the object corresponding to $A_{71}$. Consequently, when matching is performed with respect to model array data in a case where an image in an area that includes $A_{72}$ and $A_{73}$ is subjected to recognition in the vicinity of the T-type intersection, processing such as excluding A71 as well as an area having the same attribute as that of A71 from the actual image data, processing for making the value greater than a predetermined value when a decision on recognition of threshold-value level is made based upon detection of the minimum value of an error or processing for making the value smaller than a predetermined value in a case where the decision is made based upon a correlation is added to step S65, thereby making it possible to perform recognition that is not premised on area subdivision.

Fourth Embodiment

Figure 8:
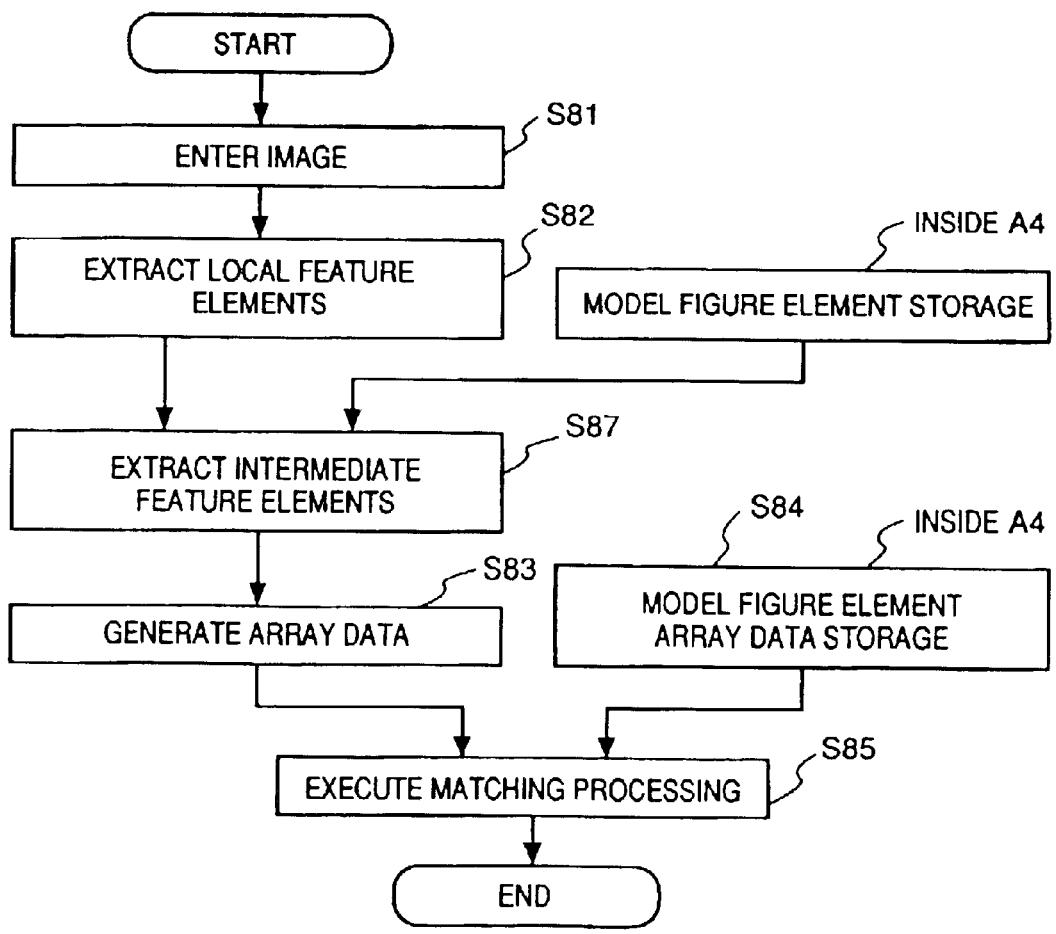
FIG. 8 is a flowchart of image recognition processing according to a fourth embodiment of the invention.

FIG. 8 is a flowchart of recognition processing in a fourth embodiment of the present invention. In FIG. 8, steps S81, S82, S83 and S85 are similar to the processing steps of S11, S12, S13, S15 in FIG. 1. At step S87, part of an image of an object is formed and a set representing a figure concept, namely intermediate figure elements which are explained below, is extracted. The model figure element storage unit A4 stores model figure elements of intermediate figure elements in advances. Model figure element array data is stored in the storage unit A4 in advance in order to perform matching with respect to the array data generated at step S83.

In the fourth embodiment, the extraction of feature elements at step S82 is followed by step S87, at which areas corresponding to, say, the eyes, nose, mouse, eyebrows and ears in the image of the face are extracted as intermediate figure elements. The extracted intermediate figure elements belong to local feature elements, of a hierarchically intermediate level, constituting an image pattern of greater complexity and of a higher order level, such as the image of an entire face. The local feature elements extracted in the first through third embodiments can be positioned as local feature elements of a lower order level and express intermediate figure elements by a spatial disposition relationship in lattice space.

After model figure elements of the eyes and mouth, etc., stored beforehand in the model figure element storage unit A4 are acquired at step S87 on the basis of spatial disposition of the local feature elements extracted at the lower order level at step S82, array data of an intermediate level is generated at step S83 by numerical value data or symbols specific to the respective intermediate figure elements.

Figure 9:
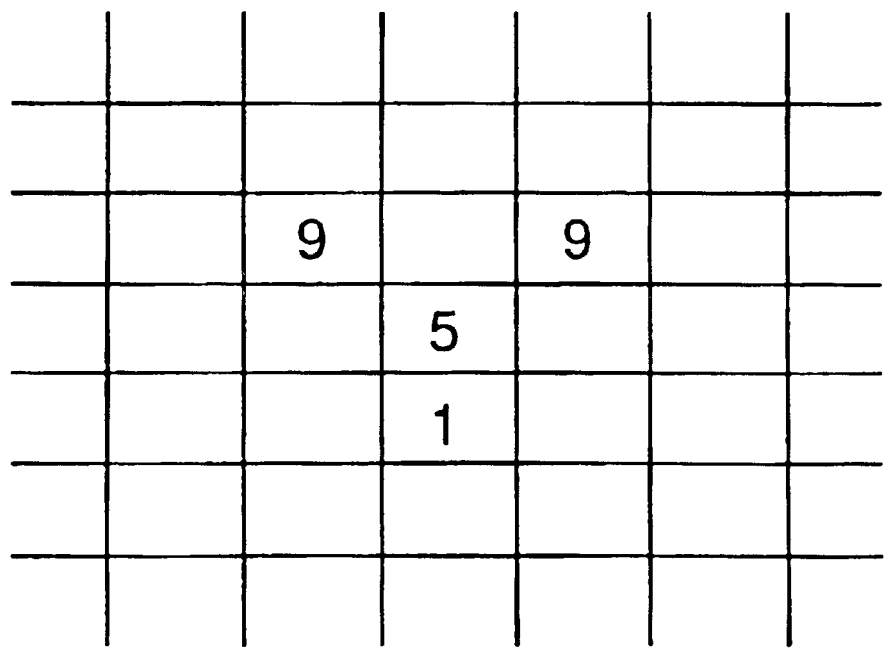
FIG. 9 is a diagram showing an example of the encoding of a facial image based upon some intermediate figure elements.

FIG. 9 is a diagram showing an example of encoding of a facial image by some intermediate figure elements. In FIG. 9, matching is performed between intermediate figure elements extracted from an image at step S87 and model figure element, which are to undergo recognition, stored in the model figure element array data storage unit A4, thereby making possible robust recognition not susceptible to adverse effects even in case of an image in which a plurality of objects are captured in overlapping form. More specifically, in recognition of a facial image, the eyes, nose and mouth, etc., which are intermediate figure elements, are extracted in preprocessing, and relative positions are encoded in lattice space to represent them (here the eyes are given the numerical value 9, the nose the numerical value 5 and the mouth the numerical value 1), as shown in FIG. 9. However, even in the case of an image in which a part of the elements in a face are missing for the above-mentioned reasons, the image can be recognized as a face if the spatial array of the other intermediate figure elements does not contradict with the constitution of a facial image.

Detection of such lack of contradiction is achieved by detecting a position at which matching with model array data of an intermediate figure-element level in the lattice space is greater (or less) than a predetermined threshold value and maximum (or minimum).

Fifth Embodiment

A method and apparatus for reconstructing an object identified by the recognition method and apparatus of each of the foregoing embodiments will now be described.

Reference will be made to the drawings to describe a fifth embodiment.

Figure 10:
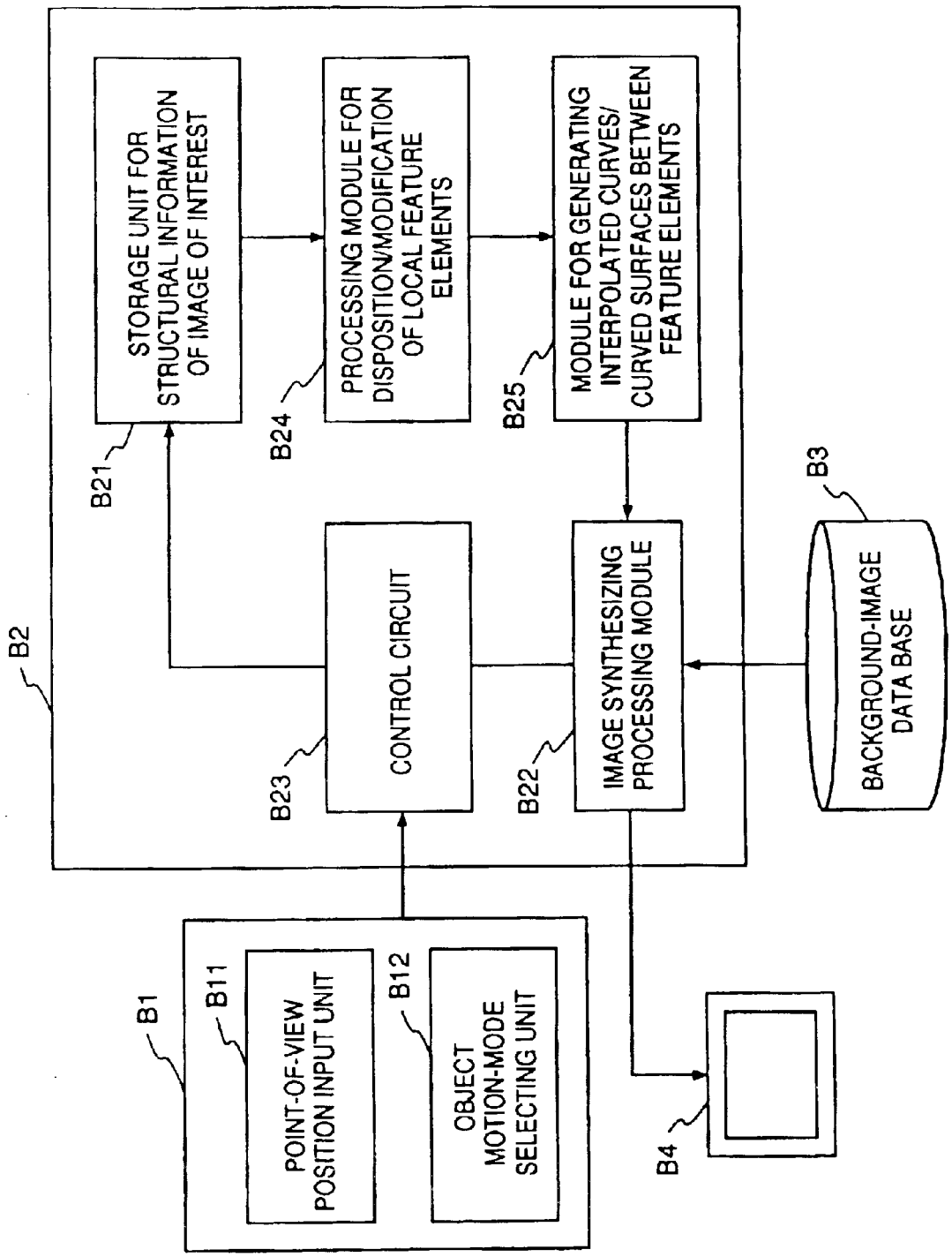
FIG. 10 is a diagram showing the configuration of an image reproducing apparatus for reproducing an image according to an embodiment of the invention.

FIG. 10 illustrates an example of the configuration of an image reproducing system. The arrows indicate the flow of main data (image data and commands). In general terms, the system includes an input unit B1 for entering a method of generating an image, an image processing module B2, a background-image data base B3 and a display unit B4. The image processing module B2 comprises a storage unit B21 for storing structural information of an image of interest that does not include background, a module B24 for adjusting the disposition of local feature elements or for modifying feature elements, a module B25 for generating interpolated curves or interpolated curved surfaces that smoothly connect discretely existing feature elements, an image synthesizing module B22 and a control circuit B23 for exercising overall control of the modules. The image synthesizing module receives an input from the background-image data base B3, combines the background with an image of interest obtained by interpolation and outputs the synthesized image to the display unit B4.

Figure 11:
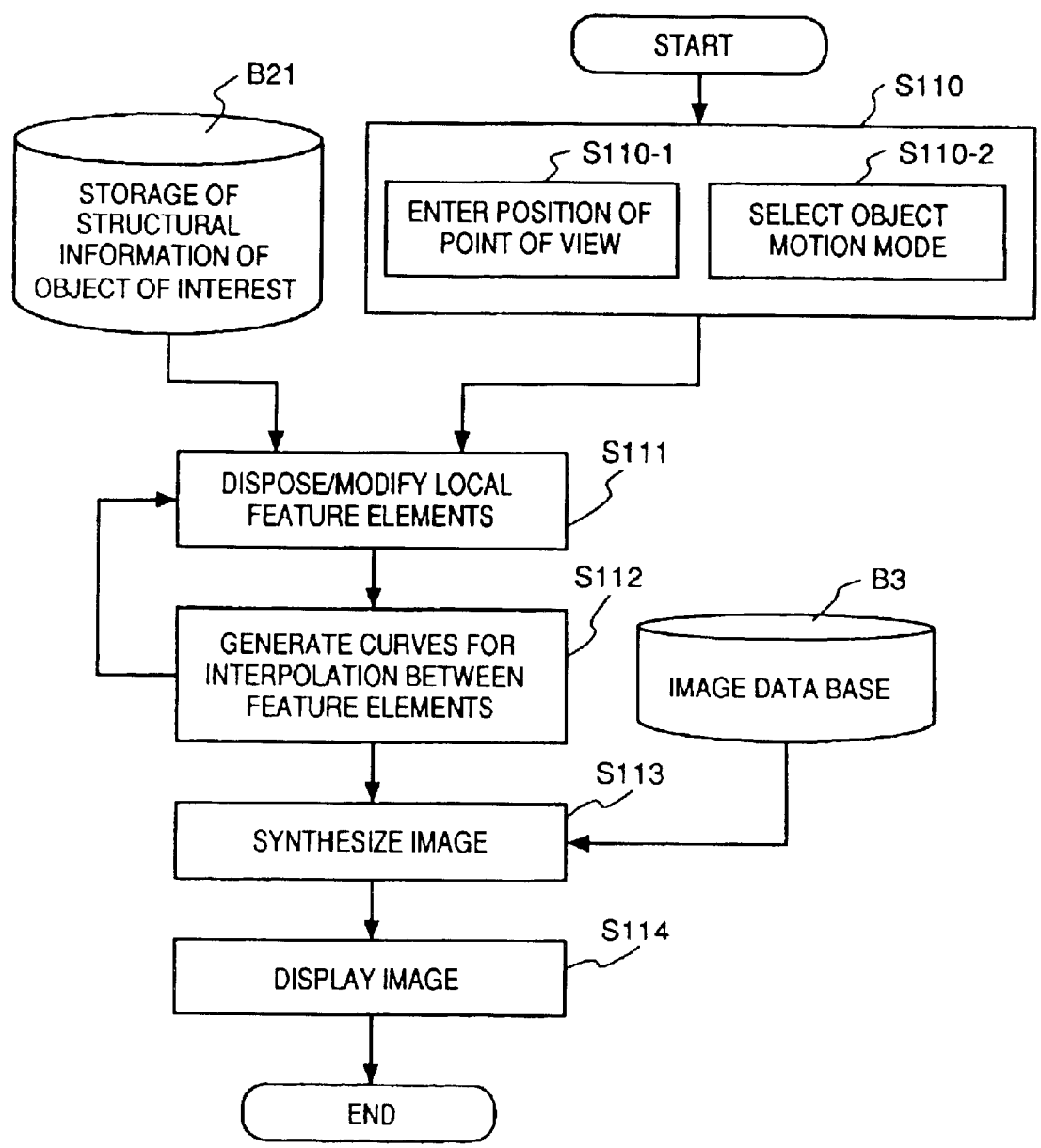
FIG. 11 is a flowchart illustrating a procedure for reproducing an image according to the present invention.

FIG. 11 is a flowchart illustrating a processing procedure for reproducing an image obtained in the first embodiment of the present invention.

As shown by the recognition processing flowchart of FIG. 11, image reproduction processing according to this embodiment is composed of a step S110 of entering the position of a point of view and selecting a mode for moving an object of interest, a step S111 of placing and modifying local feature elements, a step S112 of generating a curve for interpolating feature elements, a step S113 of synthesizing an image, and a step S114 of displaying the synthesized image.

Structural image information indicative of target objects and organisms or the like is stored in the storage unit B21 for structural information. More specifically, two-dimensional (or three-dimensional) local feature elements of the kind shown in FIG. 2, as well as three-dimensional spatial disposition information indicative thereof, is stored as information expressing a change in the image of interest that accompanies movement of the observer's point of view, movement and action of the object of interest, etc.

Further, a background image in which the image of interest constitutes the background is stored in the background-image data base B3.

Step S110 comprises steps S110-1 and S110-2. At step S110-1, the observer enters the position and direction at which the object is observed. This data is entered from the input unit B11 for entering the point of view. The input unit B11 is constituted by a keyboard and a mouse. The position of the point of view and the direction can be measured as follows: A sensor or the like can be fitted directly on the head of the observer to measure and enter the position of the point of view using magnetic transduction [e.g., "3SPACE ISOTRAK II" manufactured by Polhemus) or ultrasound (e.g., "Crystal EYES VR System", manufactured by Stereo Graphics).

A moving image or the like is selected at step S110-2 in dialog fashion as a background image for the image of interest. The moving object undergoes predetermined movement and action (e.g., if the image of interest is a human being, the movement and action can range from a change in the visage of the face, such as a change in facial expression representing joy and anger, a change in the shape of the mouth depending upon any words uttered, to motion of the body such as walking, running and playing in sports). The selected background image is used when an image of interest is generated at a location in the background image.

It should be noted that the selected moving image is stored in the background-image data base B3 in advance.

At step S112, on the basis of point-of-view position/direction data that has been entered from the input unit B11 and the information that has been entered from a mode selecting unit B12, a change in relative position of the local feature elements as well as their shape in the captured image is made in conformity with a change in point of view, and the respective elements are modified. By virtue of this processing, it is possible to reproduce an image that reflects the solid shape of the object of image and the position of the point of view.

At step S112, on the basis of the feature element data that has been subjected to modification processing at step S111, the output of the local feature element disposition/modification unit 4 is received, and the spaces between the feature elements are interpolated correctly and smoothly by curve elements.

At step S113, an image having a background other than a specific object of interest is fed from the background-image data base and combined with the image of interest.

At step S114, the synthesized image is displayed on the display unit B4.

It should be noted that the program corresponding to the flowchart of image reproduction processing described above is stored beforehand in an internal memory (not shown) within the control circuit incorporating the CPU (not shown). The CPU executes this program upon reading it out of the internal memory.

Next, the information storage format in the structural information storage unit B21 will be described taking a three-dimensional animation of the face as an example.

In this embodiment, the local feature elements shown in FIG. 2 and the three-dimensional spatial disposition of these elements are held as structural information of the individual parts images for each of the parts (e.g., the eyes, nose, mouth, ears) constructing the face, and the relationship between each part and its position (centroid position) is held as structural information of the facial image. For example, the basic structural information of an eye (as one of the parts) is as follows: L-type intersection elements ($L_1$, $\overline{L_1}$) are assigned to areas corresponding to the inside and outside corners of the eye, curve (curvature) elements ($C_{V1}$, $\overline{C_{V1}}$, ...) are assigned to the arcuate curve portions of the upper and lower parts of the eye, and these local feature elements as well as the positions of the representative points thereof (e.g., the coordinates of the left, right, upper and lower end points) are stored. As for the image structural information representing the contour of the eye, the invention is not limited to the above-described arrangement. For example, this may be represented by two curve (curvature) elements ($C_{V1}$, $\overline{C_{V1}}$) corresponding to the upper and lower parts of the eye, as well as the positions of the representative points thereof.

As for structural information necessary for expressing the shape of the pupil, this may be represented by a circle C of a prescribed radius and the position of the center thereof, or by two curvature elements ($C_{V2}$, $\overline{C_{V2}}$). In this case, the four positions ($\vec{r_{T1}}$, $\vec{r_{T2}}$, $\vec{r_{T3}}$, $\vec{r_{T4}}$) of the T-type intersections generated at the intersections of the curvature elements corresponding to the upper and lower parts of the eye with pupil may be included in the structural information.

As for the basic structural information of this facial image, the result of displaying, at a prescribed size, the image as seen from a forward-facing front side is stored as standard image information.

Furthermore, as structural information of an image obtained when the position of the point of view is changed in a horizontal plane in directions of, say, 45°, 90°, 135°, 180°, from the front direction, the local feature elements and the spatial disposition information thereof are stored beforehand in a manner similar to that of the basic structural information from the respective ones of the corresponding original images.

At step S111, in order to receive the information from the point-of-view input step S110-1 or movement-mode selection step S110-2 and generate an image from the specified position of point of view, the apparent shape of each feature element in the image, based upon the direction of the point of view, and the spatial disposition data are generated in advance from other structural information data of the direction of a discrete point of view obtained in advance.

The method of generation will now be described in greater detail.

When a three-dimensional animation or the like is expressed by the image of a line-drawing base, the modification, disappearance or appearance of contour data takes place owing to a change in the direction of the point of view.

In this embodiment, it is assumed that i-th point-of-view direction angle data, $\theta_i$ and structure information data, upon which a feature element is generated or erased due to the occurrence of an occlusion produced in conformity with a change in the direction of the point of view, have been stored beforehand in the memory (not shown) within the CPU A8 or in the image data base A10 as the following feature vector:

$$\vec{S_i} = [f_1^{1}(\vec{r_1^1}), f_2^{1}(\vec{r_2^1}), \ldots, f_{N(1)}^{1}(\vec{r_{N(1)}^1})]$$

Here each element $f_j^i(\vec{r_j^i}) = (X, \vec{r_j^i})$ is represented by the symbol X (e.g., $L_1$, etc., in case of an L-type intersection) representing the type of a j-th local feature element, and the position vector $\vec{r_j^i}$. Further, N(i) represents the maximum number of feature elements of a different type that can exist in the image of extracted feature elements from the directions of all points of view. In this structural information, assigning a specific symbol, e.g., 0, to X in the vector element $f_j^{-1}(\vec{r_j^i})$ of structural information corresponding to a local feature element that has vanished in a certain range of directions of points of view makes it possible to represent the fact that this element does not exist.

Illustrated next will be an example of a method of acquiring the point-of-view direction angle data, $\theta_i$ and structural information data (the feature vector $\vec{S_i}$). First, the above-mentioned feature elements are→extracted from an image, from various points of view, generated based upon a three-dimensional model such as a wire frame model, or from an image obtained by capturing an actual subject from various angles, and a change in position and change in shape of each extracted element accompanying a change in the point of view is followed up. Next, the corresponding i-th point-of-view direction angle data, $\theta_i$ and structural information data prevailing when a new feature element appears or when any one of already existing feature elements vanishes is stored in the memory (not shown) of the CPU A8 or in the image data base A10.

In a case where the point-of-view direction θ is in a range in which appearance or disappearance of a feature element does not occur at the time of image reproduction (i.e., $\theta_i < \theta < \theta_{i+1}$), it is necessary to presume the following as the structural information data:

$$S_\theta^{\rightarrow} = [f_1^\theta(\vec{r}_1), f_2^\theta(\vec{r}_2), \ldots f_{N(i)}^\theta(\vec{r}_{N(1)})]$$

In this case, the positions of the feature elements present in the image, $\vec{r}_h^\theta$, the shape data (e.g., the angle of the intersection in case of an L-type intersection, the curvature in case of a curvature element, etc.), $\Phi_h^\theta$ are predicted from the function $$(\vec{r}_k^\theta, \Phi_h^\theta) = F(\vec{r}_h^{i-1}, \vec{r}_h^i, \theta_{i-1}, \theta i, \theta)$$

For example, if linear interpolation is used, the function F is given by the following:

$$\vec{r}_h^\theta = a\vec{r}_h^{j-1} + (1-a)\vec{r}_h^j$$
$$\Phi_h^\theta = a\Phi_h^{i-1} + (1-a)\Phi_h^i$$
$$a = \frac{\theta_i - \theta}{\theta_i - \theta_{i-1}}$$

After the position of the prescribed point of view, the shapes of the feature elements in the motion mode and the disposition data are obtained in the manner described above, a curve smoothly connecting the feature elements is generated, for each part (e.g., the eyes, nose and mouth, etc.) of the facial image, at step S112 for generating curves for interpolation.

Next, the method of image generation will be described taking the generation of the image of an eye as an example.

Figure 12A:
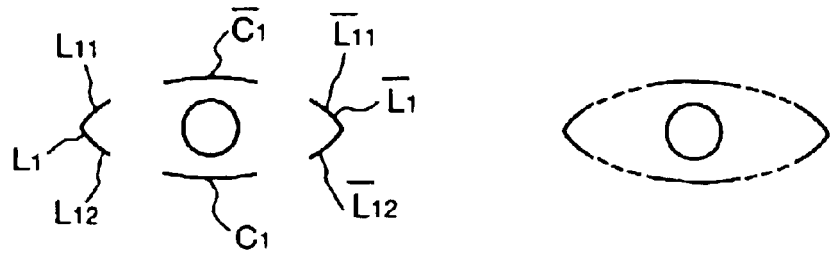
FIGS. 12A, 12B and 12C are diagrams for describing an example of a method of smoothly connecting local feature elements for a case in which an eye is described as structural information based upon the spatial disposition of two L-type intersections and four types of curvature elements.
Figure 12B:
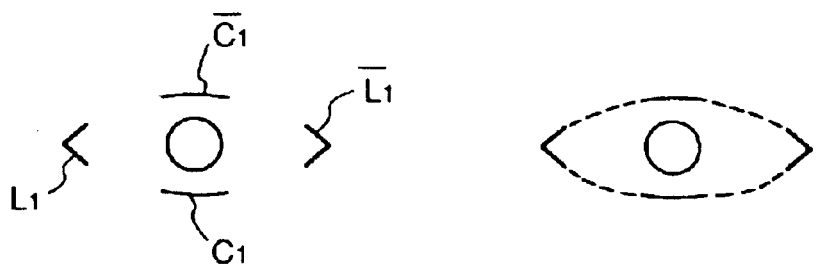
Figure 12C:
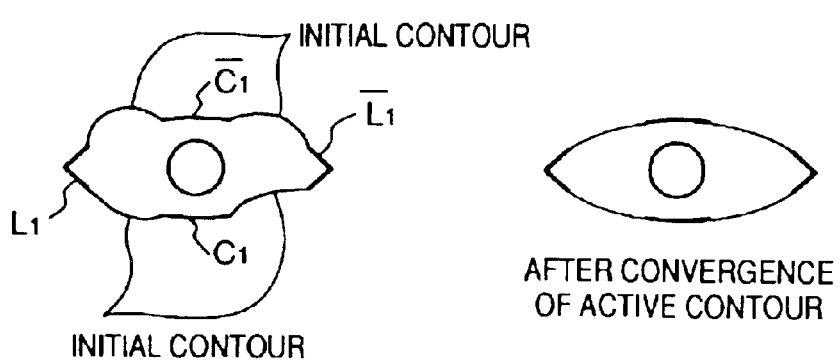

FIGS. 12A, 12B and 12C show an example of a method in which, when an eye is described as structural information based upon the spatial disposition of two L-type intersections ($L_1$, $\overline{L}_1$) and four types of curvature elements ($C_{V1}$, $\overline{C}_{V1}$, $C_{V2}$, $\overline{C}_{V2}$), these local feature elements are smoothly connected.

In case of a curvature element in which the sum of the lengths of two line segments roughly corresponds to σ, wherein the two line segments construct an L-type intersection using the feature elements constructing an object and the scaling parameters for these feature elements through the above-described object recognition method, the arc length of the element roughly corresponds to σ. In example illustrated in FIG. 12A, the unit 5 for generating curves for interpolation between feature elements connects the end of one line segment $L_{1l}$ constructing an L-type intersection $L_1$ and one end of $\overline{C}_1$ by a straight line (indicated by the dashed line in FIG. 12A). Similarly, another line segment $L_{12}$ constructing the intersection $L_1$ and $C_1$ are connected by a straight line, and so are $\overline{L}_{11}$ and $C_1$ as well as $\overline{L}_{12}$ and $C_1$, whereby the contour of the eye is formed.

Further, in example illustrated in FIG. 12B, the smooth connection between feature elements is performed by generating a spline curve. For example, in a case where feature elements are joined by a three-dimensional spline curve element, the value of the coefficients of $y = ax^3 + bx^2 + cx + d$ in a coordinate system set up in advance are selected in such a manner that the slopes will agree at each of the end points of the feature elements to be joined. The painting range can be decided to obtain the coordinates of each end point of the feature elements.

Furthermore, in method illustrated in FIG. 12C, a contour model referred to as "Snakes" (M. Kass, A. Witkin, D. Terzopoulos: "Snakes: Active contour models", *International Journal of Computer Vision*, Vol. 1, pp. 321~331) is applied. With respect to a contour v(s)=[x(s),y(s)], the contour v(s) is found which will minimize the evaluation functions $$E = \int_0^1 E_1[V_{(s)}] + \omega_0 E_0[V_{(s)}] ds$$

$$E_1[V_{(s)}] = \alpha(s)\frac{dv}{ds} + \beta(s)\frac{d^2v}{ds^2}$$

$$E_0[V_{(s)}] = \frac{1}{2}k[V(s) - V_{i(s)}(S)]^2$$

Here $V_{i(s)}(S)$ is the control point (line) of Snakes and corresponds to a line or curve element of a local feature element. The subscript i(s) corresponds to a number when the number is assigned to the feature element by an appropriate method.

A method of generating curves for interpolation between local feature elements has thus been described but does not impose any particular limitation upon the present invention.

As set forth above, a line-drawing image of each part of the entirety of an image of interest is created by connecting feature elements for each part.

In a case where a background image has been selected at step S110-2, the disposition/modification of local feature elements is produced by the processing of step S111 in a time series based upon a model prepared in advance in dependence upon the motion and action of each element. On each such occasion, shape interpolation processing is performed at step S112 and a moving image of interest is generated. It goes without saying that the moving image reflects the position of the observer's point of view.

Figure 13:
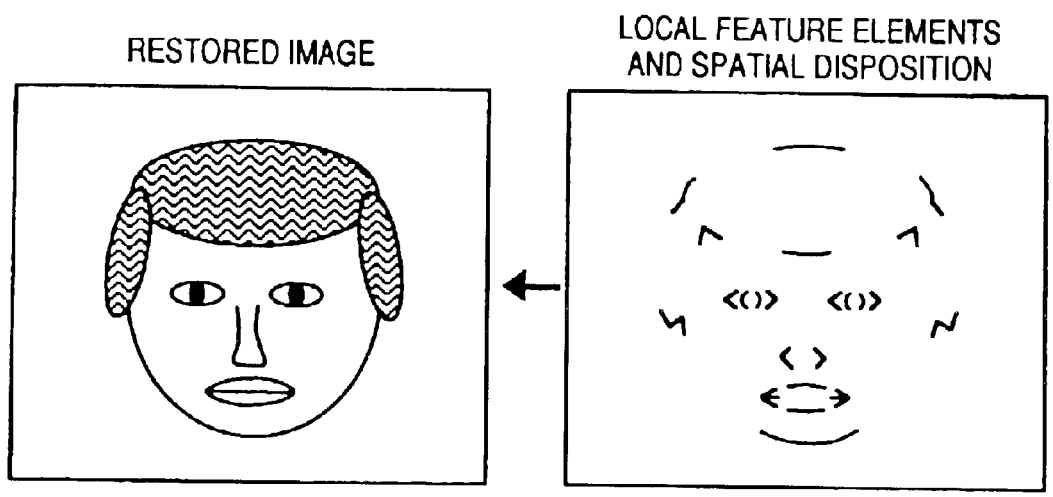
FIG. 13 is a diagram illustrating structural information and a restored image in the case of a facial image.

Furthermore, an image of interest and a background image that is selected from the image data base 6 in advance are subjected to synthesizing processing at step S113. At this time the image of interest may be subjected to texture mapping so as to be provided with shading, color and patterns. FIG. 13 illustrates an example of structural information and a restored image in the case of a facial image.

The time-series data of shape and disposition of local feature elements decided by the type of motion and action of an object of interest may be generated from an actual photographic moving image based upon a prescribed method of extracting local feature elements, and the data may be generated in a computer as models of motion and action. FIG. 14 illustrates an example of the storage format of such time-series data.

In FIG. 14, the character j represents the image frame number, N a feature element of an image of interest in the frame, f the type of feature element, $\vec{r}$ the position of the representative point thereof, x, y the position of a pixel in the frame in the horizontal and vertical directions thereof.

At step S111 shown in FIG. 11, the category and position of the representative point of each feature element are read in as control parameters and each of the feature elements is subjected to a suitable change in disposition and shape conforming to the position of the point of view.

The data shown in FIG. 14 illustrates an example of data, classified by the direction of line of sight, relating to parts in the facial image incorporated in the structural information storage unit B21 shown in FIG. 10. If necessary, the values of parameters that decide the shape of feature elements may be stored in a prescribed format.

Sixth Embodiment

A sixth embodiment is characterized in that a surface for smoothly connecting feature elements is generated at step S112 using three-dimensional surface elements as the local feature elements. The processing in the sixth embodiment basically is similar to that of the flowchart of FIG. 11. Here only the steps that differ from those of this flowchart will be described.

Figure 15:
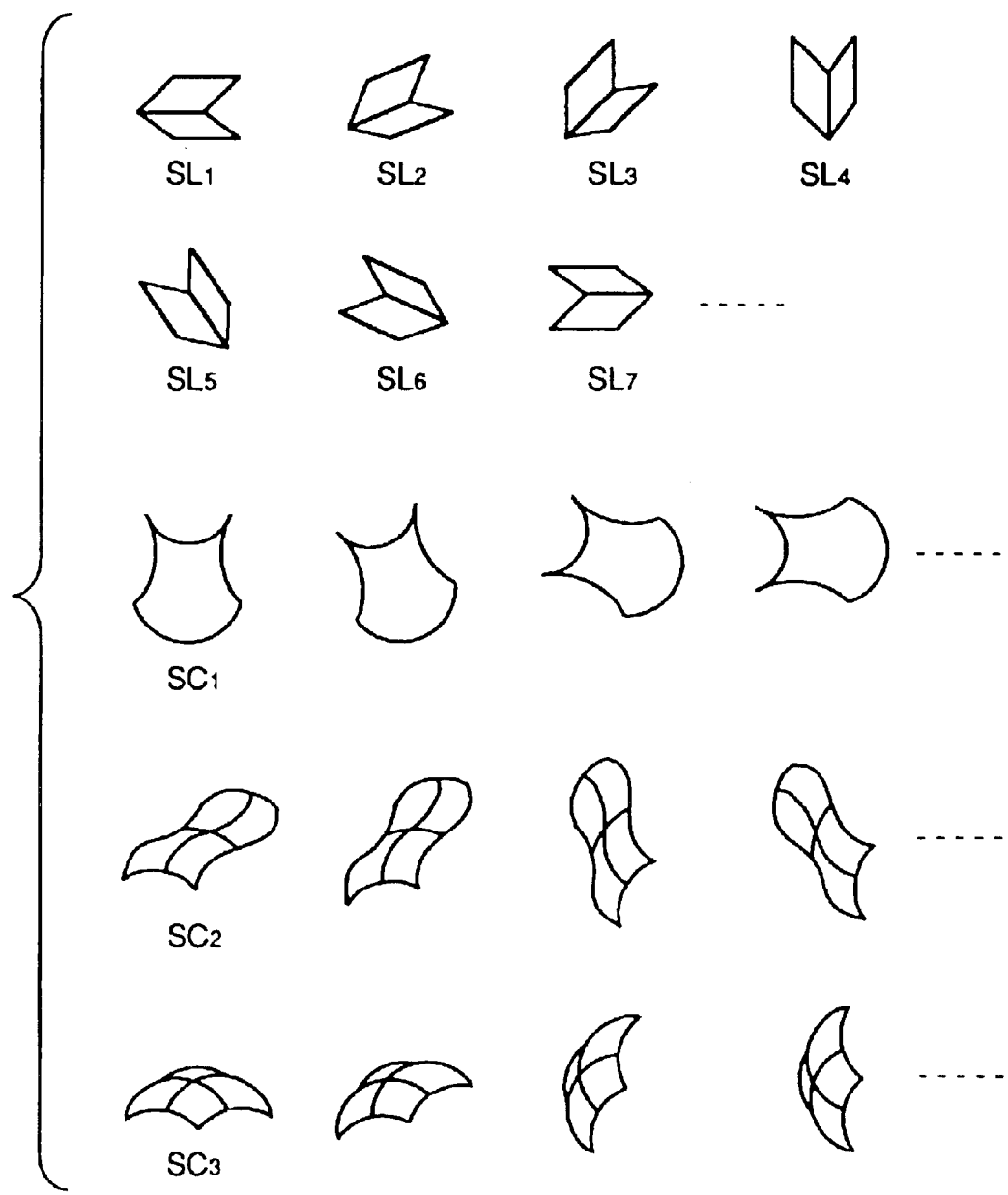
FIG. 15 is a diagram illustrating an example of local feature elements used in an image generating apparatus according to a sixth embodiment of the present invention.

FIG. 15 illustrates an example of local feature elements used in an image generating apparatus according to the sixth embodiment.

In FIG. 15, $SL_i$ represents an L-type surface element set discretely in dependence upon the intersection angle and its orientation (the direction which bisects the intersection angle and lies perpendicular to the intersection line segment.

Further, $SC_i$ represents a curved surface element designated by a Gaussian curve, average curvature (or two principal curvatures), the normal vector of the center point thereof and a size parameter. As in the manner of the surface element $SL_i$, the curved surface element $SC_i$ is set in advance by discretely setting designation parameters. $SC_1$, $SC_2$, $SC_3$ denote surface elements of different combinations of codes of two principal curvatures.

After curve data for smoothly filling in the spaces between feature elements is generated based upon the x, y, z coordinates at step S112 in order to generate the image of an object of interest, concealed-surface processing is performed based upon the direction of point of view and position, and shading, color and patterns which reflect light-ray direction and the reflection characteristics of the surface are added on. The result is displayed on the image display unit B4 at step S114.

The present invention has a number of effects, which will now be described.

In recognition processing according to the invention, local feature elements in an input image are extracted to generate disposition information, recognition information is judged by comparing the disposition information with already stored disposition information of a combination of local feature elements of an object to be recognized, and an area in which recognition information is present in the input image is decided and extracted. At this time intersection patterns of edge segments in a plurality of directions, all or some curves of a fixed curvature and the edge segments are extracted, as local feature elements, for each of scaling parameters of a plurality of different sizes. The placement information of the local feature elements is represented as a two-dimensional array of discrete numeric elements of local feature elements. Disposition information of a combination of local feature elements is represented by patterns of feature elements obtained by re-arraying the extracted local feature elements in lattice space constructed in a prescribed size and of prescribed shape units. By virtue of this method, the memory capacity necessary for the image data of the object of recognition can be reduced and the efficiency of recognition processing can be improved.

More specifically, as illustrated in the first embodiment, an image is expressed by a combination of a smaller number of local feature elements established in advance and a limited number of matrix-like spatial disposition relationships. As a result, it is possible to improve the efficiency of the object recognition process (i.e., to lower the computation cost) and enable object recognition that is not readily susceptible to a change in the size of an object in an image or to deformation of the object.

By expanding the information representing the disposition of the local feature elements to a three-dimensional array of numerical elements, object recognition not susceptible to the effects of deformation of an object in an image can be performed, without any sensitive change in the types of local feature elements extracted, at the time of object recognition from any point of view of the same object corresponding to a change in the point of view with respect to the image, and at the time of object recognition corresponding to a change in the illumination conditions when an image is sensed.

Specifically, as illustrated in the second embodiment, by mapping the three-dimensional spatial relationship of a limited number of local feature elements on representative points (points in lattice space) made three-dimensionally discrete, adopting the result as model data for mapping and measuring the degree of matching with an actual image in the same domain (lattice space), it is possible to greatly improve the efficiency of processing, and reduce the required memory capacity, necessary for image recognition of a solid from the position of any point of view.

Furthermore, by extracting area base information such as the color of a neighboring area of local feature elements, the local space frequency and strength and generating information indicative of the disposition of the local feature elements and area base information, robust recognition can be carried out, without performing area subdivision in advance, as illustrated in the third embodiment, even in a case where a plurality of objects reside in an image and some of the plurality of objects overlap or contact one another, thereby resulting in deformations in which the original shape of an object is lost or hidden.

As a result, which object is to be recognized and the particular position in an image are outputted, a captured image centered on this position or a partial image centered on the image of interest is extracted from the original image, and editing in which a captured image centered on a specific target or an image containing the specific target is combined with another image is performed efficiently and robustly. The information necessary to accomplish this can be outputted.

In addition, by extracting intermediate figure elements of local feature elements and generating information representing the disposition of the intermediate figure elements, recognition based upon hierarchical feature extraction can be carried out. Even in an image in which a plurality of objects are captured in overlapping form, it is possible to perform robust recognition not readily susceptible to the effects of such overlapping.

Specifically, as illustrated in the fourth embodiment, intermediate figure elements are extracted and relative positions are encoded in lattice space as preprocessing. Even in case of an image in which any of the elements are missing for the above-mentioned reasons, the image can be recognized if the spatial array of the other intermediate figure elements does not contradict the constitution of the object to be recognized.

Further, in processing for reproducing a recognized image in the present invention, the spatial disposition of local feature elements defined in advance is expressed as structural information of an image. As a result, the generation of the image of a specific target from the position of any different point of view and the generation of an image attendant upon movement of the target can be performed without a detailed three-dimensional model such as a wire frame model.

As a result, the quantity of data necessary for generating a three-dimensional image can be reduced greatly in comparison with the prior art.

Furthermore, the generation and extinction of masked contours accompanying a change in the position of the point of view can be stored in memory beforehand. As a result, computation cost can be reduced and processing time shortened in comparison with a method in which a display is presented by performing geometrical computations from a three-dimensional shape model of an object and the position of the point of view.

As many apparently widely different embodiments of the present invention can be made without departing from the spirit and scope thereof, it is to be understood that the invention is not limited to the specific embodiments thereof except as defined in the appended claims.

What is claimed is:

1. An object recognition method comprising the steps of:
storing a model array data of plural local feature elements constructing an object at each position of a predetermined lattice pattern space;
extracting the local feature elements from an input image and generating detecting levels of the local feature elements as array data; and
matching the array data and the model array data on the basis of a correlation of the array data extracted from the input image and the model array data,
wherein the local feature elements are geometrical elements constructing a face or a part of the face; and
wherein the local feature elements are cross patterns of an edge segment or curved lines of a predetermined curvature.

2. The method according to claim 1, wherein the detecting level of the local feature elements is a level for obtaining a region information.

3. The method according to claim 1, wherein the detecting level is a detecting level of a color information.

4. The method according to claim 1, wherein the lattice pattern space is two dimensional or three dimensional.

5. An image processing apparatus comprising:
a memory that stores characteristic models constructing an object and model array data thereof;
a generating device that extracts local feature elements resembling the characteristic models included in an input image by comparing the input image with the characteristic model stored in the memory based on a predetennined detecting level and generating array data related to a position and an arrangement of the local feature elements on a predetermined lattice pattern space; and
a recognition device that recognizes a specific object based on a correlation of the array data related to the position and the arrangement of the local feature elements generated by the generating device and the model array data stored in the memory,
wherein the local feature elements are geometrical elements constructing a face or a part of the face; and
wherein the local feature elements are cross patterns of an edge segment or curved lines of a predetermined curvature.

6. The apparatus according to claim 5, wherein the detecting level of the local feature elements is a level for obtaining a region informaiion.

7. The apparatus according to claim 6, wherein the detecting level is a detecting level of a color information.

8. The apparatus according to claim 5, wherein the lattice pattern space is two dimensional or three dimensional.

9. The apparatus according to claim 5, wherein the characteristic model is one of plural parts, or one of modified models changed sizes and/or view point directions of the plural parts.

10. An image processing apparatus comprising:
a memory that stores characteristic models constructing an object and model array data thereof;
a generating device that extracts local feature elements resembling the characteristic models included in an input image by comparing the input image with the characteristic model stored in the memory based on a predeteimined detecting level and generating array data related to a position and an arrangement of the local feature elements on a predetermined lattice pattern space; and
a recognition device that recognizes a specific object based on a correlation of the array data related to the position and the arrangement of the local feature elements generated by the generating device and the model array data stored in the memory,
wherein the local feature elements are geometrical elements constructing a face or a part of the face,
wherein the detecting level of the local feature elements is a level for obtaining a region information, and
wherein the detecting level is a detecting level of a color information.

* * * * *